United States Patent
Ishida et al.

(10) Patent No.: US 6,373,815 B1
(45) Date of Patent: Apr. 16, 2002

(54) OPTICAL DISC HAVING OSCILLATING LANDS AND GROOVES

(75) Inventors: Takashi Ishida, Yawata; Shin-ichi Tanaka, Tuzuki-gun; Akira Mutoh, Sakai; Yoshinari Takemura, Settsu; Shunji Ohara, Higashioska; Isao Satoh, Neyagawa, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/400,537

(22) Filed: Sep. 21, 1999

Related U.S. Application Data

(63) Continuation of application No. 08/958,336, filed on Oct. 27, 1997.

(30) Foreign Application Priority Data

Oct. 25, 1996 (JP) .............................. 8-283622
Nov. 27, 1996 (JP) .............................. 8-315939

(51) Int. Cl.$^7$ ............................... G11B 7/00
(52) U.S. Cl. .................. 369/275.3; 369/47.27
(58) Field of Search ........................ 369/275.4, 275.2, 369/275.3, 44.13, 47.27

(56) References Cited

U.S. PATENT DOCUMENTS

| | | |
|---|---|---|
| 4,901,300 A | 2/1990 | Van Der Zande et al. |
| 5,204,852 A | 4/1993 | Nakagawa et al. |
| 5,303,216 A | 4/1994 | Shinoda et al. |
| 5,377,178 A | 12/1994 | Saito et al. |
| 5,426,629 A | 6/1995 | Saitou et al. |
| 5,537,178 A | 7/1996 | Horikiri |
| 5,537,373 A | 7/1996 | Horikiri |

(List continued on next page.)

FOREIGN PATENT DOCUMENTS

| | | |
|---|---|---|
| EP | 0 696 795 A1 | 2/1996 |
| EP | 0 727 774 A1 | 8/1996 |
| EP | 0 740 291 A2 | 10/1996 |
| EP | 0 740 291 A3 | 1/1998 |
| JP | 1-220126 | 9/1989 |
| JP | 7-210873 | 8/1995 |
| JP | 8-7276 | 1/1996 |
| JP | 10-91967 | 4/1998 |
| TW | 322572 | 12/1997 |
| WO | 96/25736 | 8/1996 |

OTHER PUBLICATIONS

Patent Abstracts of Japan, vol. 096, No. 008, Aug. 30, 1996 & JP 08 096417 A (NEC Corp), Apr. 12, 1996, *abstract*.

Office Action issued in corresponding Japanese Application No. 11–235054 dated Mar. 21, 2000.

*Primary Examiner*—Nabil Hindi
(74) *Attorney, Agent, or Firm*—Parkhurst & Wendel, LLP

(57) ABSTRACT

In an optical disc, an ID field contains a plurality of address information, and is preliminarily recorded in convex and concave signals, and is composed of two sets offset by about ½ track pitch toward the internal or external track direction adjacent to the guide track, an information recording field is composed of grooves and lands oscillating at a single frequency in the radial direction, and the grooves and lands alternate in every revolution of the guide track. When w bits of information are included in one period of oscillation, an information unrecorded field between the ID field and information recording field is arranged to have a length of w/10 bits or more and/or w bits or less, and therefore, when recording continuous information data such as video data, it is possible to record continuously by generating a clock securely from the oscillating signal, and moreover, the format efficiency is improved, so that a format of a larger capacity is achieved.

1 Claim, 14 Drawing Sheets

U.S. PATENT DOCUMENTS

| | | |
|---|---|---|
| 5,539,724 A | 7/1996 | Ohtomo |
| 5,715,217 A | 2/1998 | Fuji |
| 5,724,327 A | 3/1998 | Timmermans et al. |
| 5,754,506 A | 5/1998 | Nagasawa et al. |
| 5,805,565 A | 9/1998 | Miyamoto et al. |
| 5,809,006 A | 9/1998 | Davis et al. |
| 5,835,461 A * | 11/1998 | Kobayashi et al. ...... 369/44.13 |
| 5,838,658 A | 11/1998 | Nakane et al. |
| 5,844,882 A | 12/1998 | Yoshida et al. |
| 5,848,050 A * | 12/1998 | Nagasawa et al. ....... 369/275.3 |
| 5,862,123 A * | 1/1999 | Horie et al. .............. 369/44.13 |
| 5,867,474 A * | 2/1999 | Nagasawa et al. ........ 369/275.3 |
| 5,872,767 A | 2/1999 | Nagai et al. |
| 5,933,410 A * | 8/1999 | Nakane et al. ............ 369/275.3 |
| 5,936,932 A * | 8/1999 | Nakane et al. ............ 369/275.3 |
| 5,936,933 A * | 8/1999 | Miyamoto et al. ....... 369/275.3 |
| 5,946,285 A * | 8/1999 | Nakane et al. ............ 369/275.3 |
| 5,982,738 A * | 11/1999 | Miyamoto et al. ....... 369/275.3 |
| 6,069,870 A * | 5/2000 | Maeda et al. ............. 369/275.3 |
| 6,075,761 A * | 6/2000 | Akiyama et al. ......... 369/44.13 |

* cited by examiner

OPTICAL DISC HAVING OSCILLATING LANDS AND GROOVES

This is a Continuation of application Ser. No. 08/958,336 filed Oct. 27, 1997.

FIELD OF THE INVENTION

The present invention relates to a format of an optical disc, and more particularly to a rewritable optical disc.

DESCRIPTION OF THE PRIOR ART

Optical discs are presently very widely used as a media for recording software such as picture, sound and computer data. In particular, lately, there is an increasing demand for enhancing optical disc recording density, and the development of an optical disc format suitable to meet such a demand is therefore highly desirable.

A format of an existing "130 mm rewritable optical disc" is described below.

The format of the 130 mm rewritable optical disc is specified in JIS X 6271. The format includes type A format in which a continuous groove is spirally formed on a disc, and the lands between the grooves are used as tracks for recording signals, and type B format, in which samples marks are formed on a disc, and tracking is controlled by a sample servo system.

The tracks for recording information data in the type A format are wobble (i.e., slight vibration)-free tracks, and information data is recorded only in the lands (between grooves). In type A format, a standard user data format in the case of user data capacity of 512 bytes is shown in FIG. 14. Numerals shown in the diagram refer to the number of bytes (B) to be distributed in each signal. In the user bytes of 512 B, correction codes, re-synchronization bytes and control bytes are added, and the data field has a capacity of 650 B. In the sector for recording signals in the data field, it is necessary to add a sector mark (SM) designating the beginning of the sector, a VFO field for synchronizing with clock reproduction, an ID field showing the sector address, a pre-recorded address field such as an address mark (AM) showing the beginning of the ID field, an offset detection field (ODF) for rewriting the data, and including ALPC used in inspection of laser output, a buffer field of 15 B used to preclude overlap with the succeeding sector, and other fields, as necessary. As a is result, the total sector capacity is 746 B. For the user data capacity of 512 B, the buffer field is 15 B, and there is a redundancy of about 2.9%. For a further larger capacity, it is desired to curtail the redundancy as much as possible.

In such a conventional rewritable optical disc, when recording information on a wobble-free guide track, usually, the information is processed by using a fixed clock associated with the optical disc device. However, due to effects of rotation fluctuations or eccentricity when recording and reproducing information in an optical disc, the actual sector length may, in fact, deviate from the ideal sector length, thereby causing an increase or decrease in the number of clock pulses counted by a fixed clock. For example, if the number of clock pulses is decreased, the information cannot be recorded completely within the sector and may overflow into the next sector. Hence, the buffer field is provided by considering preliminarily a clock decrement, so that the sector length is extended. By the corresponding portion, therefore, the redundancy increases, and user data capacity is sacrificed.

Besides, when recording data continuous in time, such as video data and audio data, in the conventional method of recording after once confirming the address of the sector, if the sector address can not be confirmed, it takes time to confirm the address again and record, and continuous data can not be recorded. In another method of recording data wherein the sector address is predicted from a previous address without reconfirming the sector address, errors are accumulated when counting the sector length by a fixed clock, and the counting deviation increases.

In particular, in the intermediate address method in the land-groove recording system having a possibility of decline of address detection precision, it was possible that the above problem of continuous recording of video data and audio data could be even more serious.

Further, in the future, if there are optical discs having several different data capacities with narrower track pitch in the rewritable field, the format of the optical discs must be such that they are all compatible with each other.

OBJECT AND SUMMARY OF THE INVENTION

The present invention is devised in light of the above-described problems, and it is hence an object thereof to provide an optical disc having such a format as to obtain easily a recording and reproducing apparatus of high reliability capable of controlling tracking or stably generating a clock, and an apparatus for stably manufacturing such optical discs.

Further, in an optical disc containing both a ROM field (including read-in area) and a rewritable field, it is an object of the present invention to provide an optical disc format capable of generating a stable clock for processing information data at the beginning of the rewritable field, and recording information data accurately. It is also an object to present a format capable of easily achieving compatibility of several types of optical discs differing in their respective data capacities.

To achieve these and other objects, a first aspect of the optical disc of the invention relates to an optical disc having an ID field, an information recording field, and an information unrecorded field between the ID field and the information recording field, formed in every one of a plurality of sectors composed on a guide track, in which the ID field contains a plurality of address information, and is recorded in convex and concave signals, and composed of two sets deviated by about ½ track pitch each in the direction of internal or external circumferential track adjacent to the guide track, the information recording field is composed of grooves and lands (between grooves) wobbling (oscillating slightly) at a single frequency in the radial direction, and the grooves and lands are changed over in every turn of the guide track.

A second aspect of the optical disc of the invention relates to an optical disc wherein when the information contained in one period of wobble is w bits, the information unrecorded field between the ID field and information recording field has a length of w/10 bits or more and/or w bits or less.

A third aspect of the optical disc of the invention relates to an optical disc in which the information to be recorded in the information recording field begins with a specific phase of wobble frequency.

A fourth aspect of the optical disc of the invention relates to an optical disc in which the sector has a length of an integer multiple of the wobble frequency, and an integer number of the sectors are contained in every turn of the guide track.

A fifth aspect of the optical disc of the invention relates to an optical disc having an ID field and an information recording field, formed in every one of a plurality of sectors composed on a guide track, in which the ID field contains a plurality of address information, and is recorded in convex and concave signals, the information recording field is composed of grooves and lands (between grooves) wobbling (oscillating slightly) at a single frequency in the radial direction, the grooves and lands are changed over in every turn of the guide track, the sector has a length of an integer multiple of the wobble period, an integer number of the sectors are contained in every turn of the guide track, and the initial phase of every turn of the guide track of the wobble is within ±n bits of information bits, the final phase within ±m bits, and their relation is n <=m (n, m being natural numbers).

A first aspect of the optical disc manufacturing apparatus of the invention comprises ID signal generating means for generating a signal for the ID field, specified signal generating means for generating a signal in portions other than the ID field, wobble signal generating means for generating a wobble signal at a single frequency, timing signal generating means for providing a gate signal of specified timing, first signal selecting means for selecting either the ID signal or the specified signal, deflection signal generating means for issuing a deflection signal for deviating the ID field by about ½ track pitch each to the inner circumferential side and outer circumferential side of two sets, second signal selecting means for selecting either the wobble signal or the deflection signal, deflecting means for receiving the output of the second signal selecting means and deflecting the light spot, and reset means for resetting the phase of the wobble signal in every revolution of the optical disc.

A second aspect of the optical disc manufacturing apparatus of the invention comprises first signal selecting means for making valid either the ID signal or the specified signal, light spot diameter adjusting means for changing the size of a light spot by receiving the timing signal, on/off control means for making valid/invalid the wobble signal by the timing signal, deflecting means for receiving the output of the on/off control means and deflecting the light spot, and reset means for resetting the phase of the wobble signal in every revolution of the optical disc.

A sixth aspect of the optical disc of the invention relates to an optical disc composed of coexistence of a ROM field having information with a length of at least one track formed in convex and concave pit rows, and a rewritable field with a length of at least one track, in which an information unrecorded field with a length of at least one track is recorded is formed between the ROM field and the rewritable field, the rewritable field has a spiral or concentric guide track wobble in the radial direction, the ROM field is formed of spiral or concentric convex and concave pit rows, and a part or a whole field at the rewritable field side of the information unrecorded field has a transition field having a spiral or concentric guide track wobbling in the radial direction continuously or intermittently.

A seventh aspect of the optical disc of the invention relates to an optical disc in which the ROM field is a read-in field, and the track pitch To of the ROM field and the track pitch Tw of the rewritable field have the following relationship: To >=Tw.

BRIEF DESCRIPTION OF THE DRAWINGS

FIG. 6($b$) is a diagram for explaining the phase deviation of wobble in the optical disc of the second embodiment of the invention.

FIG. 8($b$) is a diagram for explaining the phase deviation of wobble in the optical disc of the third embodiment of the invention.

DETAILED DESCRIPTION OF THE INVENTION

Embodiments of the invention are described below.

Embodiment 1

Figure 4:
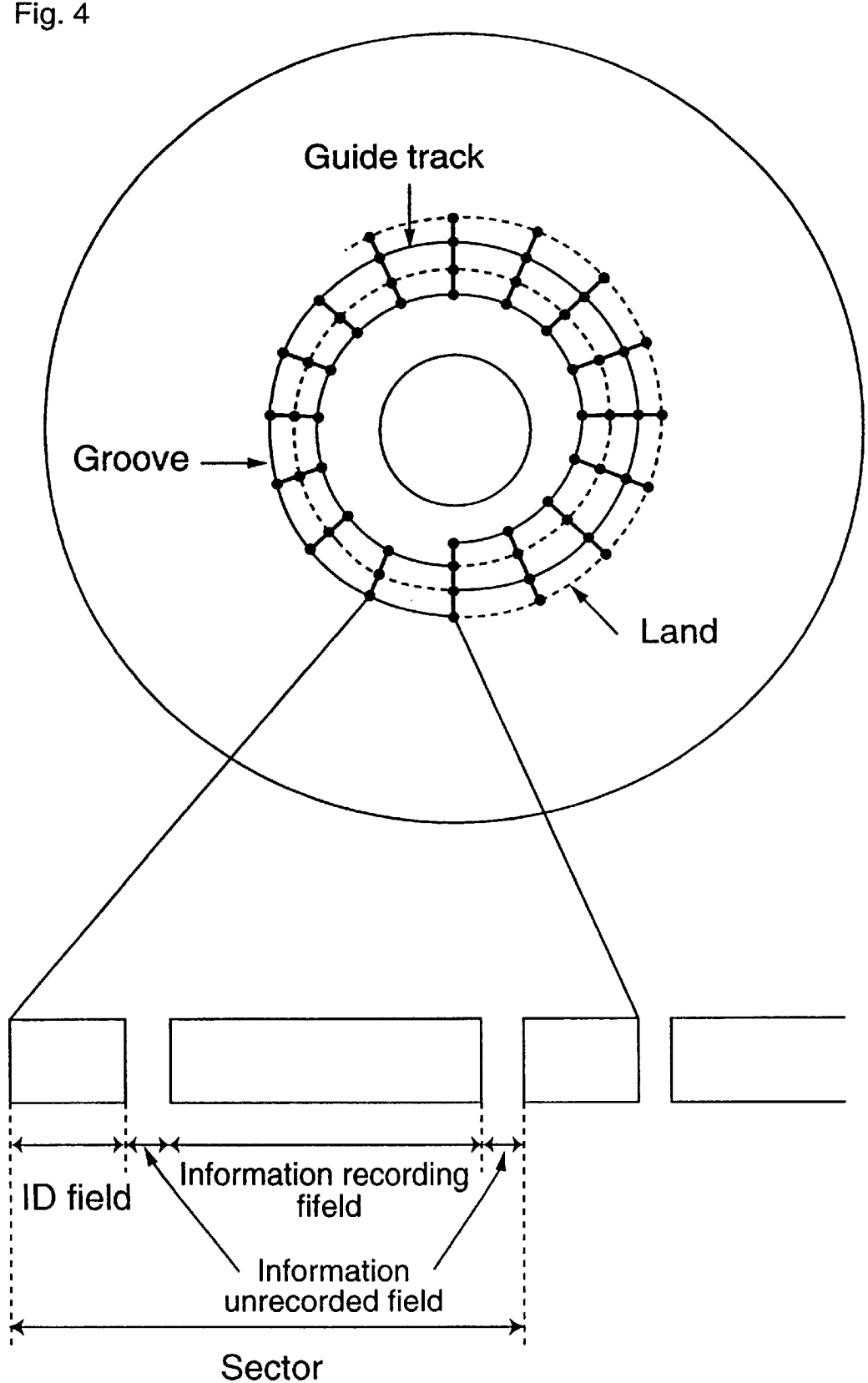
FIG. 4 is a schematic diagram of the optical disc of the first embodiment of the invention.

FIG. 4 is a schematic diagram of an optical disc according to a first embodiment of the invention.

As shown in FIG. 4, the guide track of the optical disc is arranged so that the optical head can follow same when recording or reproducing information, and it is designed to change over the groove (solid line) and land (dotted line) by every revolution. Having a plurality of sectors in one revolution, the sector is composed of an ID field, information recording field, and information unrecorded field. The illustrated guide track is spiral, but it may be concentric, or spiral in a reverse direction. The number of sectors per revolution is also arbitrary.

Figure 1:
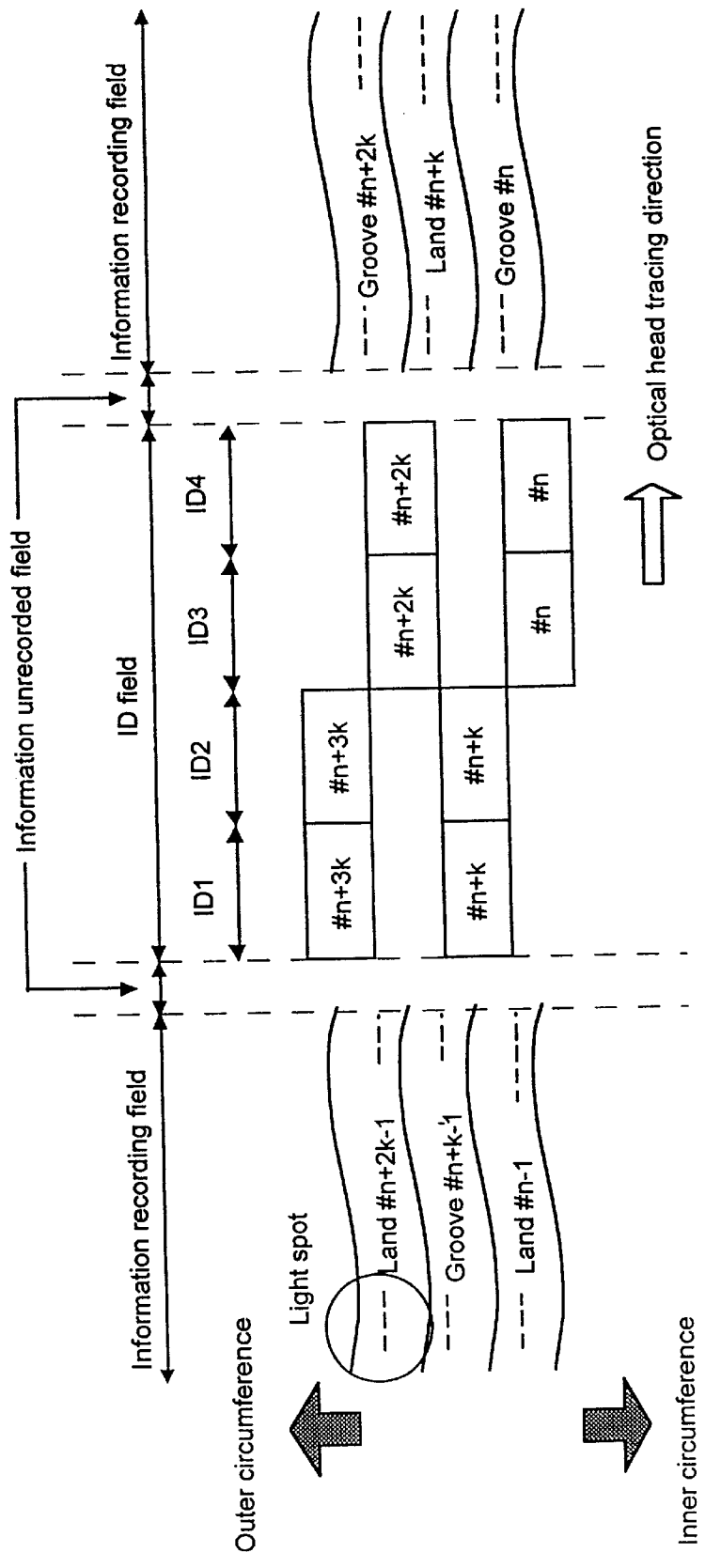
FIG. 1 is a diagram showing a format structure changing over grooves and lands in an optical disc of a first embodiment of the invention.

FIG. 1 shows a groove and land changeover portion in the optical disc of the first embodiment of the invention. The ID field consists of four parts, ID1, ID2, ID3, ID4, each containing address information, and ID1 and ID2 and ID3 and ID4 are paired respectively, and are deviated by a distance of about ½ of track pitch to the inner circumferential side or outer circumferential side from the guide track. The guide track also wobbles in an orthogonal direction to the tracing direction of the optical head.

The operation of the optical head moving from the inner circumferential side to the outer circumferential side and recording or reproducing continuously is described below in a case in which the number of sectors per revolution of the optical disc is k (k>1). When the optical spot is at land #n−1 of the information recording field, after tracing ID1 and ID2 (#n+k) and ID3 and ID3 (#n) successively in the ID field, it moves into groove #n in the information recording field to record or reproduce. Thereafter, when the optical disc rotates one turn and returns, the optical spot passes the ID field from groove #n+k−1 in the information recording field, and moves into the portion of land #n+k in the information recording field, thereby recording or reproducing.

Figure 2:
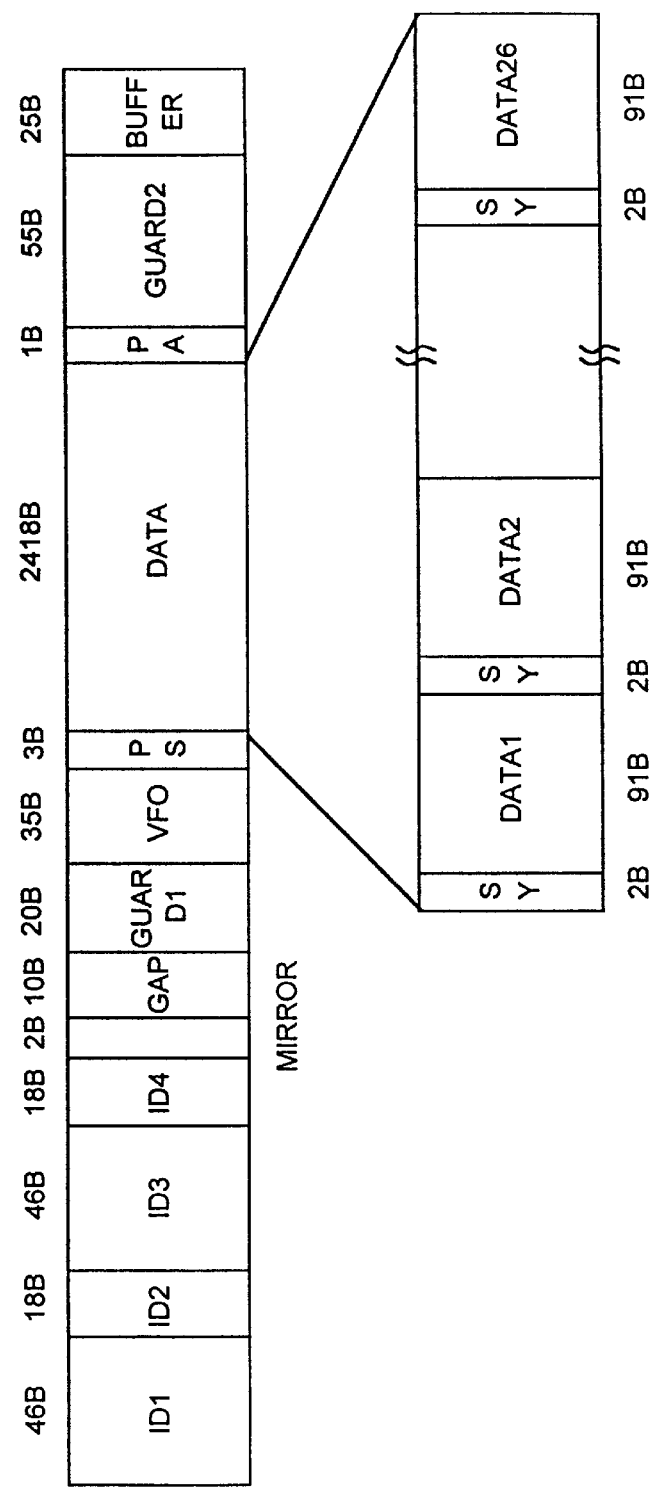
FIG. 2 is a detailed diagram of a sector format in the optical disc of the first embodiment of the invention.

FIG. 2 shows the detail of the sector format in the optical disc of the first embodiment of the invention. The capacity of one sector is 2697 B, including the ID field, information unrecorded field, and information recording field. Actually, the information is recorded in the information recording field, which consists of guard 1 field (20 B), VFO field (35 B), PS field (3 B), data field (2418 B), PA field (1 B), and guard 2 field (55 B). Of them, in particular, the data field of 2418 B is composed of SY field (2 B) and 26 sets of data 1, data 2, . . . data 26 (91 B each). The data field includes the error correction codes, and the actual user capacity is 2048 B. The ID field consists of ID1 (46 B), ID2 (18 B), ID3 (46 B), and ID4 (18 B). The information unrecorded field consists of mirror field (2 B), gap field (10 B), and buffer field (25 B).

ID1 through ID4 are provided for recognizing the address of the sector, and it is also possible to recognize whether the next incoming guide track is a groove or a land. Of the unrecorded field, the mirror field and gap field are fields for adjusting the laser power in recording. The buffer field is provided for adjusting the deviation of the information data in the time axis direction due to optical disc rotation fluctuation or optical disc eccentricity. The buffer field has 25 B, and for the user data of 2048 B, the redundancy is about 1.2%. The guard 1 field and guard 2 field are for protecting the recording medium from deterioration at the data starting or finishing end due to repeated recording of information data. The VFO field is provided for assisting the operation of the PLL circuit for producing a reproduction clock when reproducing. The PS field shows the beginning of information data, and the PA field determines specifically when demodulating the final data of the information to be recorded, according to the rule based on the digital modulation.

Figure 3:
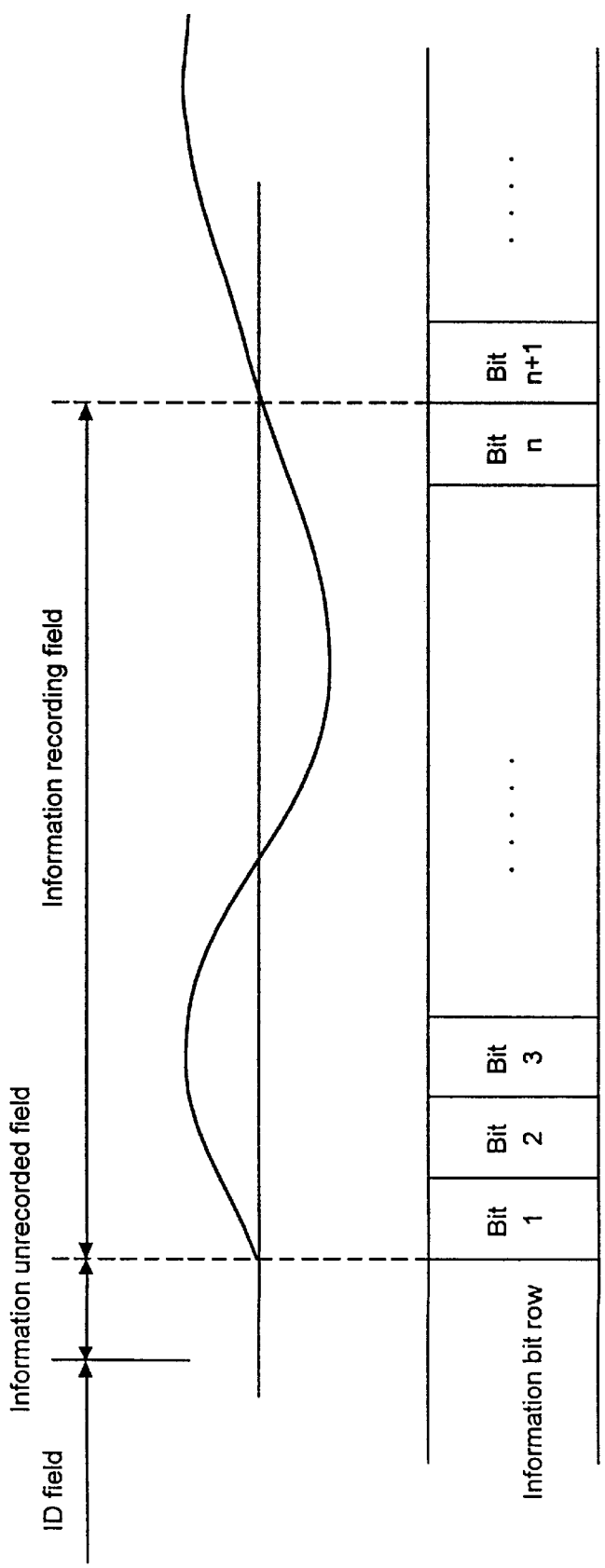
FIG. 3 is a diagram showing a configuration of information data and guide track wobble.

FIG. 3 shows the configuration of the information data and guide track in the optical disc of the first embodiment of the invention. In FIG. 3, when the wobble phase is 0, recording starts for bit 1, which is the first bit in the information data bit row. In the illustrate example, the phase is 0, but this phase may be an arbitrary phase.

Figure 5:
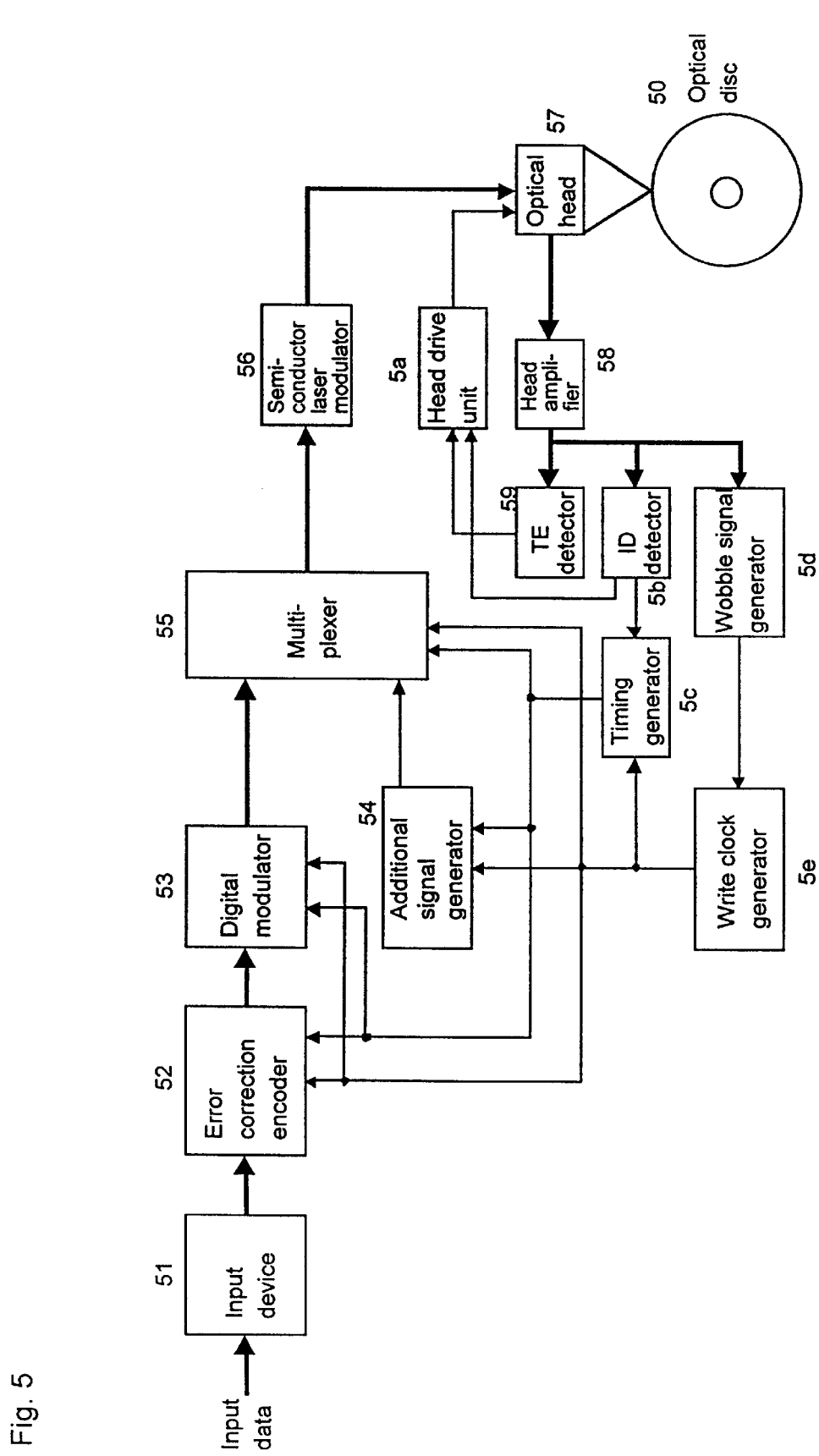
FIG. 5 is a block diagram of an optical disc device for recording information in the optical disc of the first embodiment of the invention.

Fig. 5 is a block diagram of an optical disc device for recording information in the optical disc of the first embodiment of the invention. With reference to the optical disc device of FIG. 5, the recording operation of information data into an actual optical disc is described below.

In FIG. 5, reference numeral 50 is an optical disc, 51 is an input I/F, 52 is an error correction encoder, 53 is a digital modulator, 54 is an additional signal generator, 55 is a multiplexer, 56 is a semiconductor laser modulator, 57 is an optical head, 58 is a head amplifier, 59 is a TE (tracking error signal) detector, 5a is a head driver, 5b is an ID detector, 5c is a timing generator, 5d is a wobble signal detector, and 5e is a write clock generator.

Through the input I/F 51, digitized audio data, video data, computer data and other principal information are entered. The input data is fed into the error correction code generator 52, and an error correction code is calculated, and added to the input data.

On the other hand, the optical head 57, determines the target sector for recording the information in the optical disc 50, the light spot is traced sequentially on the ID field, information unrecorded field, and information recording field on the optical disc 50. That is, the optical head 57 irradiates the optical disc 50 is with laser light of almost constant power. The reflected light has an intensity change, and is photoelectrically covered by the photo detector on the optical head, and a reproduced signal (RF signal) is detected. Since the reproduced signal is a low amplitude signal, it is amplified by the head amplifier 58, and, then passed into the TE detector 59, ID detector 5b, and wobble signal detector 5d. The signal passed to the TE detector is used as the basis for tracking whether a groove or land of the optical disc is being tracked, and the detected TE signal and the phase TE signal and the phase information of land/groove are put into the head driver 5a. The head driver 5a sends the driving signal for tracking the light spot to the optical disc 50 from these signals, to the optical head 57. As a result, the light spot can accurately trace the guide track of the optical disc 50.

In this tracking active state, the signal entering the ID detector 5b is transformed into a binary value, of 0 or 1, i.e., digitized. From the binary digital signal row, first, the address of the target sector is searched. Besides, from the obtained four address values, the manner of changeover from land to groove, or from groove to land is known, and therefore, in tracking, it is possible to use as the phase signal of land or groove.

As a result of the above operation, when the timing for detecting the address by the ID detector 56 is sent into the timing generator 5c, the timing generator 5c generates and sends out various timing signals for operating the error correction code generator 52, digital modulator 53, additional signal generator 54, and multiplexer 55 at specified times.

Usually, the timing generator 5c creates various signals by using a fixed clock, and in the optical disc 50 of the invention, a wobble signal is detected from the track guide, and the signal of specific frequency can be taken out, and therefore, from this signal, the clock synchronized with the rotation of the optical disc 50 can be created. That is, the wobble signal detector 5d receiving the output signal from the head amplifier 58 in FIG. 5 extracts the wobble signal of specific frequency from that signal through, for example, a band pass filter. The extracted signal is passed to the write clock generator 5e. In the write clock generator 5e, a clock signal synchronized with the rotation is produced in the PLL circuit.

The clock synchronized with the rotation of the optical disc 50 created in the write clock generator 5e is provided to the digital signal generator 53, additional signal generator 54, multiplexer 55, and timing signal generator 5c.

The digital modulator 53 receiving the output signals from the error correction encoder 52, that is, the information data and error correction code data automatically replaces the original 0 and 1 continuous data into other 0 and 1 continuous data according to a specific scheme. The output from the digital modulator 53 is passed to the multiplexer 55. On the other hand, the additional signal generator 54 generates signal for the guard 1 field, VFO field, PS field, guard 2 field and others, aside from the data fields shown in FIG. 2. The signal for the PA field is usually based on the specific manner of the digital modulation, and is hence generated in the digital modulator 53. Generation of the SY signal in the data field is possible in both the additional signal generator 54 and digital modulator 53. The output from the additional signal generator 54 is provided to the multiplexer 55. The two signals provided to the multiplexer 55 are adjusted in timing, and passed to the semiconductor laser modulator 56. In the semiconductor laser modulator 56, a driving signal for modulating the output of the semiconductor laser mounted on the optical head 57 is created, and sent into the optical head 57.

The optical beam having a specified output value is emitted from the optical head 57 to the optical disc 50, and information data is recorded in the optical disc 50.

Conventionally, the information data was processed by a fixed clock, and recorded, and, not synchronized with the rotation of the optical disc, it was possible that, in a worst case, the information data could not be recorded in the determined sector length. However, by using the optical disc of the invention wherein the guide track wobbles or oscillates, the clock synchronized with the rotation can be used as mentioned above. As a result, the information data can be recorded in a specified sector securely.

Meanwhile, the clock created from the wobble signal causes a deviation from the wobble phase, actually, due to the performance of the PLL circuit for generating the clock signal. The length of the information unrecorded field of the sector is determined as follows in consideration of the phase deviation of the wobble.

Since noise is contained in the wobble signal, a phase deviation occurs in the clock created from the wobble signal. Assuming the C/N of wobble signal to be 15 dB and the bandwidth of the PLL circuit for creating the clock from the wobble signal to be 1 kHz, if the noise components contained in the wobble signal are in normal distribution, and further assuming that the noise level where the probability of the wobble signal not being transformed into binary value by fixed slice is 1/100000 and further, supposing the information bit quantity entering in one period of wobble to be w bits, the minimum phase deviation is calculated to be 0.15 w bits. On the other hand, the maximum deviation can be easily settled within about ±w/2 bits. Hence, the length of the information unrecorded field for absorbing the deviation of the recording clock of sector can be controlled at 0.1 w bits or more and within w bits.

By calculating on the assumption that the information data quantity contained in one period of wobble to be 93 bits, since it is possible to deviate in both + and − directions, the length of the information unrecorded field may be w/10=9.3 bits or more and w=within 93 bits.

In the embodiment, however, in order to further enhance reliability, the data capacity of the unrecorded field, that is, the buffer field, is set nearly twice the appropriate value, that is, 25 B=200 bits. Even at the nearly double data capacity of 25 B of the appropriate value, it is about 1.2% for the user data capacity of 2048 B, which is considerably lower value as compared with 2.9% of the prior art.

At this time, in the sector format shown in FIG. 2, the entire sector is 2697 B, and there are 232 wobble periods of 93 bits each. Moreover, one track is composed of an integer number of sectors. Accordingly, since the wobble phase is complete in every sector and in every track, the design of the recording and reproducing apparatus is simplified. It also solves the problem of change of phase of wobble in every track.

As the information to be recorded, in the case of audio data or (moving pictures) video data, the continuously generated information must be processed and recorded. However, if recorded while confirming the address of ID field in every sector, if failing to detect the address, the continuously entering data cannot be recorded completely. Or, in the event of a failed address, it may be possible to record by predicting from the address of the preceding sector. However, since such prediction is based on the count value of the fixed clock, errors are accumulated in the count value due to rotation fluctuation of the optical disc. As a result, the data to be recorded in the sector may overflow to the succeeding sector.

However, in the format of the optical disc of the first embodiment of the invention, since the wobble signal is used as the reference, the above problems can be solved easily. As shown in FIG. 3 by determining the record start point in every sector on the basis of phase 0 of the wobble signal, as far as there is no error in the wobble signal detection, if the address cannot be detected, continuous recording is possible. Besides, accumulation of count values of clock in every sector does not occur.

In each field, specific data distribution is arbitrary. The data quantity and data distribution of the sector format in FIG. 2 are examples only and are not meant to be limiting.

As described herein, according to the optical disc of the first embodiment of the invention, in recording of continuous information data such as audio data and (moving picture) video data, if the address of the ID field provided in each sector cannot be detected, it is possible to record continuously by generating a clock securely from the wobble signal, and a format realizing a larger capacity than in the prior art can be provided.

Embodiment 2

Figure 6:
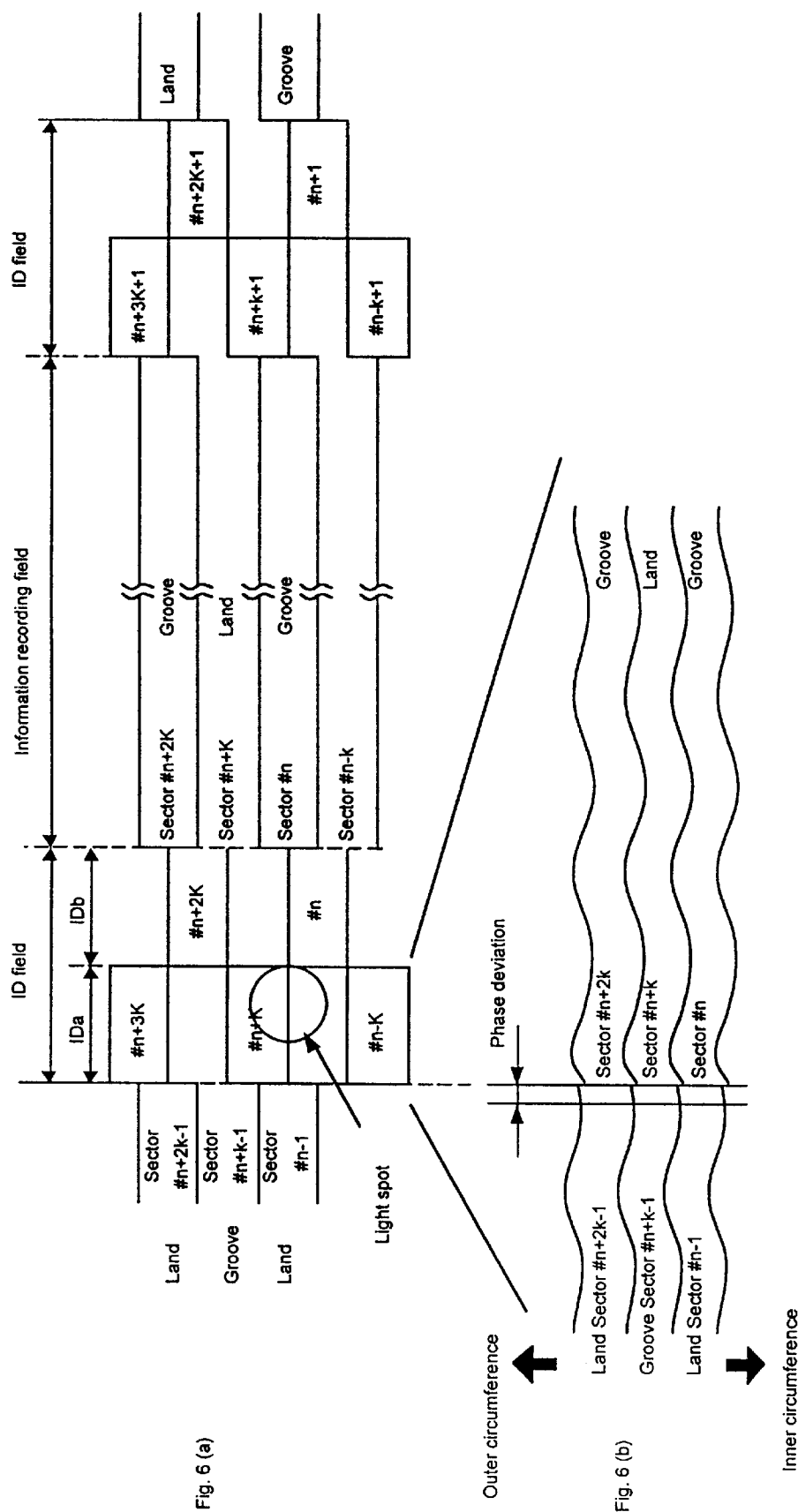
FIG. 6($a$) is a structural diagram of an ID field deviated by ½ track pitch in an optical disc of a second embodiment of the invention.

FIG. 6(a) shows the address field of an optical disc in an L/G (land and groove information recording and reproducing) system in an optical disc in a second embodiment of the invention. In the optical disc in FIG. 6(a), the address information in the ID field consists of two sets, and the distance is deviated by ½ track pitch to the inner circumferential side or outer circumferential side. The width of the convex and concave signal is nearly equal to the width of the groove and land in the information recording field. The groove and land are changed over in every turn of the track. The ID field consists of two portions, IDa and IDb, each containing address information, and is deviated from the guide track to the inner circumferential side or outer circumferential side by about ½ distance of the track pitch. That is, one address is shared by the adjacent groove and land. The guide track (information recording field) wobbles in the direction orthogonal to (in the radial direction to) the tracing direction of the optical head.

FIG. 6(b) explains the phase deviation of wobble at a changeover point of groove and land once in every track in the optical disc of the second embodiment of the invention. The wobble has an integer multiple period in every sector, and the track has an integer number of sectors in every turn. Therefore, in one turn of the optical disc, the wobble phase must be continuous, but due to effects of manufacturing such as rotation fluctuation of the optical disc, a deviation occurs between one revolution of the optical disc and the clock as the reference for data processing, and the wobble phase may not be matched completely. Accordingly, within the wobble phase, the initial phase upon start of wobble and final phase after one turn of track must be set to a specified value.

Supposing the initial phase of wobble in every turn of the guide track to be in bits of information bits and the final phase to be ±m bits of information bits, it is the initial phase that is stable in precision without effects of rotation fluctuation, and it is the final phase that suffers most from the effects of rotation fluctuation, and hence the relation of n m is established.

Concerning the initial phase, by resetting in every turn of the track, accumulation of phase deviation is avoided. Therefore, usually, the initial phase is adjusted within ±1 bit of information bit.

The condition of the final phase m is described below.

When the light spot traces the intermediate land (the land is not cut) between a groove and adjacent groove in a finished optical disc, it is supposed that the frequency of wobble is ω, the deviation is θ in cutting the groove and the phase deviation is −θ in the adjacent groove. Supposing that the wobble signal obtained in an ideal state without phase deviation is A·COS ωt, the practical wobble signal with phase deviation is A·COS(ωt+θ)+A·COS(ωt−θ)=2A·COS θ· COS θt.

That is, the wobble signal is a signal modulated by the portion of the phase deviation (COS θ). As a result, it leads to the possibility of inconvenience in circuit operation. Accordingly, as far as possible, it is required to decrease this phase deviation so that the phase deviation may not be accumulated. If the phase deviation θ is within $\frac{1}{10}$ of the period, we obtain (COS θ)<=(COS(2π/10)=0.81 and the original signal level is maintained, and the phase deviation is within a sufficiently allowable range. That is, supposing one period of wobble to be w bits of information bits, the relation with the final phase m as far as the quality of wobble signal is practically sufficient is m≦w/10.

Herein, the initial phase of the wobble signal is adjusted to be 0 in the boundary between the front portion of the ID field and the information recording field, but it may be defined in another place, for example, in the boundary between the rear portion of the ID field and the information recording field.

Figure 7:
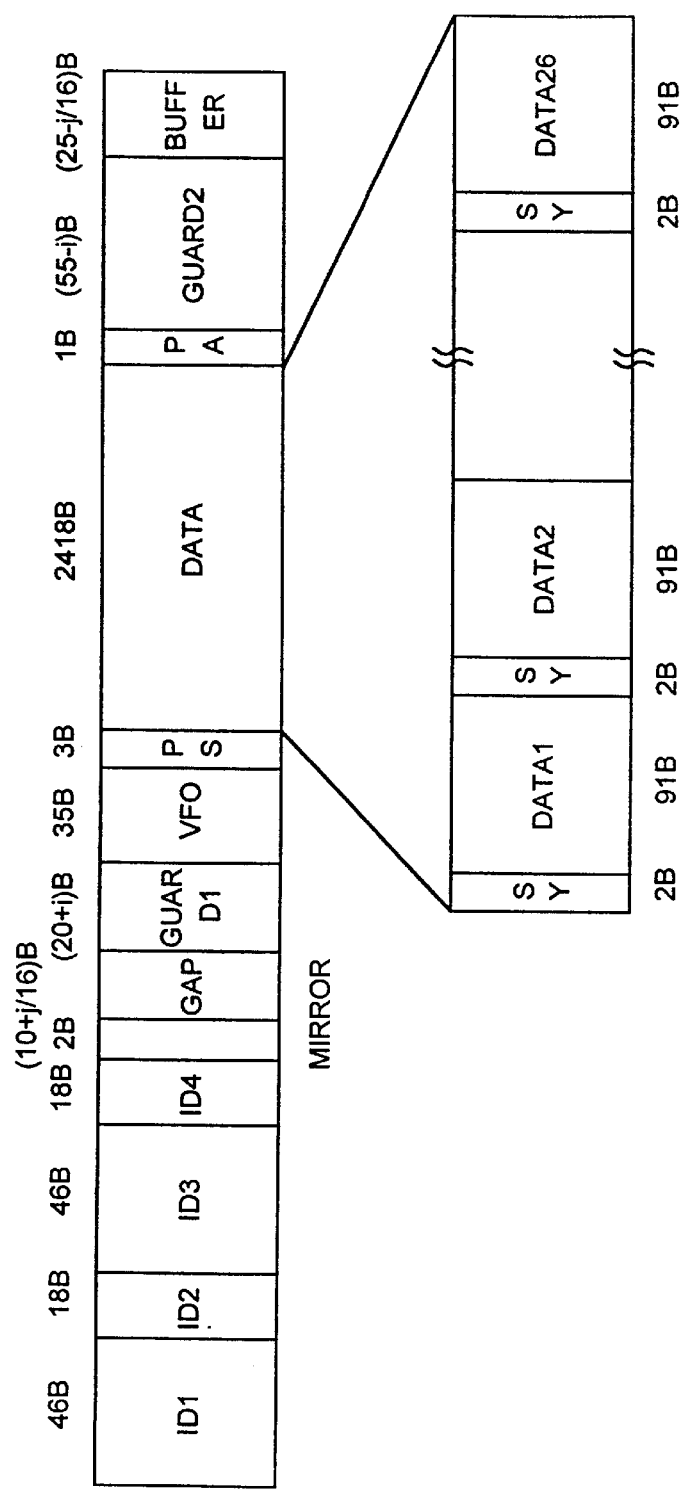
FIG. 7 is a detailed diagram of a sector format in the optical disc of the second embodiment of the invention.

The detail of the sector format of the optical disc of the second embodiment of the invention is shown in FIG. 7. It is basically the same as FIG. 2 showing the format of the optical disc of the first embodiment described above. What differs is the guard 1 field (20+I B), guard 2 field (55−I B), gap field (10+j/16 B), and buffer field (25−j/16 B). Herein, I is an integer from 0 to 7, j is an integer from 0 to 16, and I and j are selected randomly, and the length of the guard 1 field, guard 2 field, gap field, and buffer field varies in every recording. As a result, deterioration of the recording medium due to repeated recording is prevented, and the number of times of recording is improved.

According to the optical disc of the second embodiment of the invention described herein, an integer number of sectors are contained in one turn of the guide track the sector length is set at integer times of the period of wobble, and the initial phase and final phase of wobble are at specified precision, and therefore the wobble phases are matched when recording and reproducing, so that tracking control and clock generation of the optical disc device may be stabilized.

Embodiment 3

Figure 8:
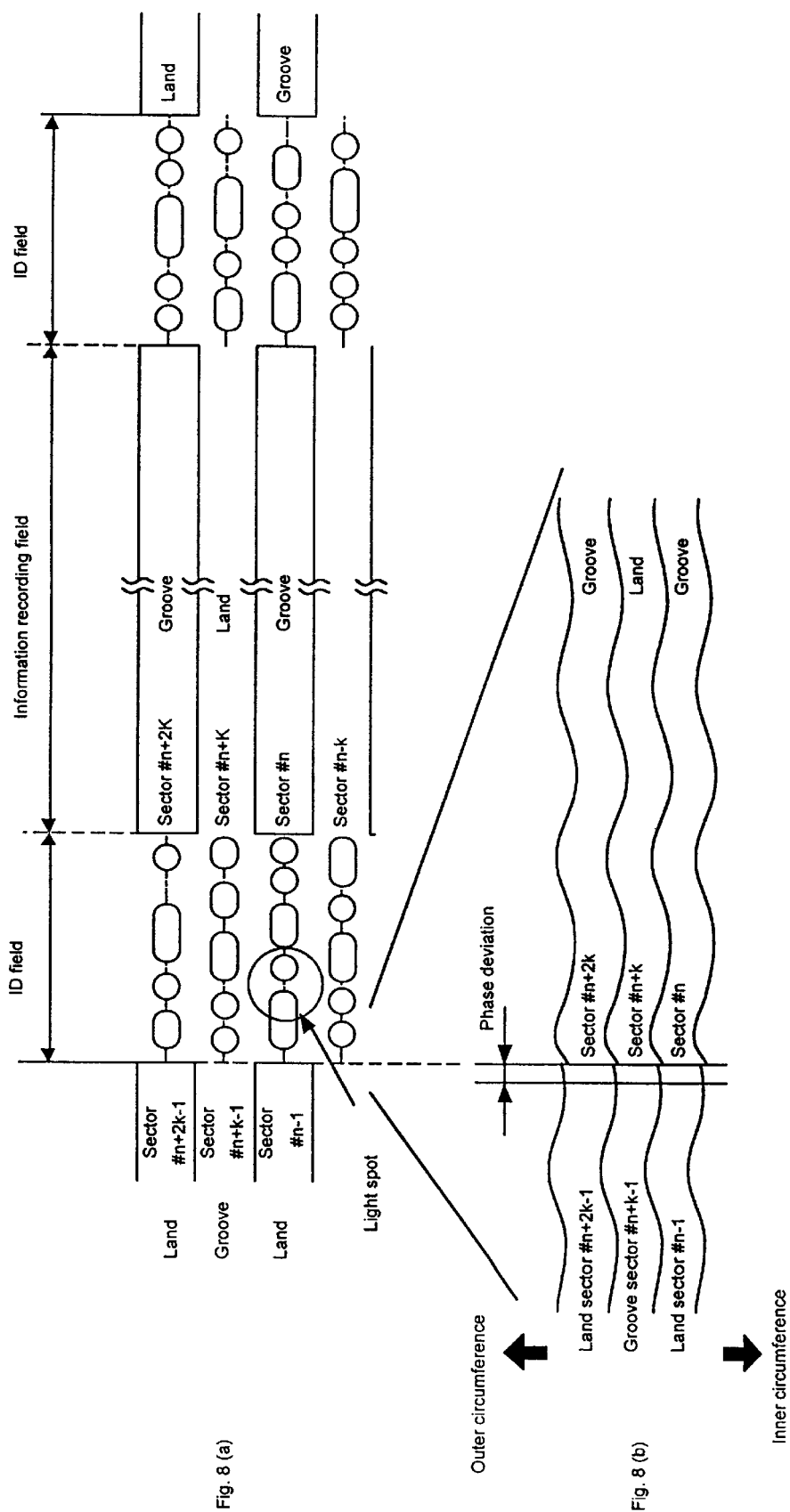
FIG. 8($a$) is a structural diagram of an ID field in which lands and grooves have independent addresses, in an is optical disc of a third embodiment of the invention.

FIG. 8(a) shows an address field of an optical disc of an L/G (land and groove recording and reproducing) system in an optical disc in a third embodiment of the invention. In the optical disc in FIG. 8(a), the address information of the ID field is independently provided in the land and the groove, being positioned in the middle of the land and groove. To suppress crosstalk from the adjacent track, the pit width of convex and concave signals in the ID field is smaller than that of the groove or land.

FIG. 8(b) explains the phase deviation of wobble at the changeover point of groove and land one in every turn of the track, in the optical disc of the third embodiment of the invention. The wobble has an integer multiple period in every sector, and the track has an integer number of sector in every turn. Therefore, in one turn of the optical disc, the wobble phase is continuous, but due to effects of manufacturing such as rotation fluctuation of the optical disc, a deviation occurs between one revolution of the optical disc and the clock as the reference for data processing, and thus, the wobble phase may not be matched completely. Accordingly, within the wobble phase, the initial phase upon start of wobble and final phase after one turn of track must be set to a specified value.

Supposing the initial phase of wobble in every turn of guide track to be ±n bits of information bits and the final phase to be ±m bits of information bits, it is the initial phase that is stable in precision without effects of rotation fluctuation, and it is the final phase that suffers most from the effects of rotation fluctuation, and hence the relation of n≦m is established.

Concerning the initial phase, by resetting in every turn of the track, accumulation of phase deviation is avoided. Therefore, usually, the initial phase is adjusted to within ±1 bit of information bit.

As in the optical disc of the second embodiment, supposing one period of wobble to be w bits of information bits, the relation with the final phase m is m≦w/10.

As described herein, according to the optical disc of the third embodiment of the invention, the address of the ID field is independently provided in the land and groove, an integer number of sectors are contained in one turn of the guide track, the sector length is set at integer times of the period of wobble, and the initial phase and final phase of wobble are at a specified precision, and therefore, the wobble phases are matched when recording and reproducing so that tracking control and clock generation of the optical disc device may be stabilized.

Embodiment 4

Figure 9:
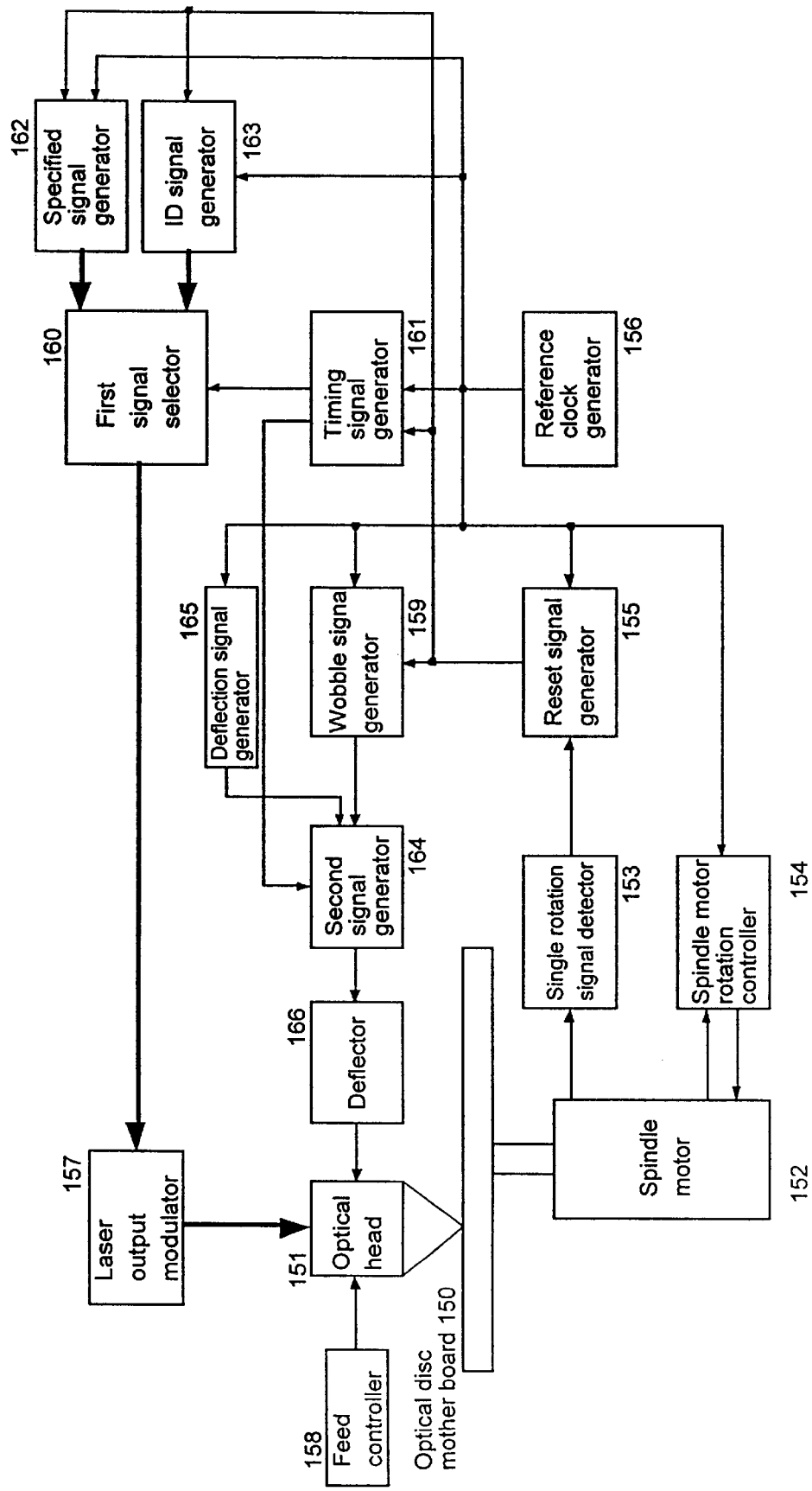
FIG. 9 is a structural diagram of an optical disc manufacturing apparatus according to a fourth embodiment of the invention.

FIG. 9 shows an optical disc manufacturing apparatus according to a fourth embodiment of the invention. This optical disc manufacturing apparatus is designed to manufacture an optical disc having two sets of address information in the ID field, being deviated by a distance of ½ track pitch to the inner circumferential side or outer circumferential side, as explained in FIG. 6(a) and FIG. 6(b).

Using this optical disc manufacturing apparatus, the actual cutting operation of an optical disc is described below. In FIG. 9, reference numeral 150 is an optical disc mother board, 151 is an optical head, 152 is a spindle motor, 153 is a single rotation signal detector, 154 is a spindle motor rotation controller, 155 is a reset signal generator, 156 is reference clock generator, 157 is a laser output modulator, 158 is a feed controller, 159 is a wobble signal generator, 160 is a first signal selector, 161 is a timing signal generator, 162 is a second signal selector, 163 is an ID signal generator, 164 is a second signal selector, 165 is a deflection signal generator, and 166 is a deflector in order to form ID field and grooves (land) of guide tracks in the optical disc mother board 150, the optical disc mother board 150 attached to the spindle motor 152 is rotated, and while applying a feed control in the radial direction, the optical head 151 emits an output modulated laser light to illuminate the optical disc mother board 150.

Particularly, to control the rotation of the spindle motor 152, the spindle motor rotation controller 154 receives a signal (for example, a Frequency Generator signal) accompanying the rotation from the spindle motor 152, compares this signal with the clock from the reference clock generator 156, and adjusts the rotating speed and phase of the spindle motor. It is, however, difficult generally to match with the reference clock accurately in the bit unit owing to the effects of response characteristic of the spindle motor 152, eccentricity of the optical disc mother board 150, etc.

On the other hand, modulation of laser light output issued from the optical head 151 is carried out as follows. The signal for the ID field is issued from the ID signal generator 163. The signal generated in the ID signal generator 163 is issued as a digital data row of 0 or 1, being synchronized with a clock, on the basis of the clock issued from the reference clock generator 156. The ID signal generator 163 receives a reset signal synchronized with one revolution from the reset signal generator 155, and synchronizes in every revolution. The output from the ID signal generator 163 is fed into the first signal selector 160.

When forming the groove, specified data is obtained from the specified signal generator 162. Usually, the laser is emitted when forming the groove, while laser light is not emitted in the land. Therefore, the output signal is changed over in every revolution, and the laser repeats lighting and extinguishing (output large/small) in every revolution.

The signal from the specified signal generator 162 is also fed into the first signal selector 160. The output signal from the first signal selector 160 selects to issue either one of the two input signals depending on the output of the timing signal generator 161. In the address fields of ID1 to ID4, the signal from the ID signal generator 163 is selected, and in other fields, the signal from the specified signal generator 162 is selected. The timing signal generator 161 receives the reference clock issued from the reference clock generator 156 and the reset signal issued from the reset signal generator 155, and produces and issues a timing signal for selecting various signals. Receiving the output signal from the first signal selector 160, the laser output modulator 157 sends out a signal to the optical head 151 so that the laser light of specified intensity may be issued from the optical head 151. As a result, the optical head 151 emits laser light at a specified output value, and illuminates the optical disc mother board 150.

In generation of wobble to the guide track, the wobble signal from the wobble signal generator 159 is used. In the ID field, the address is deviated by ½ track pitch by using the deflection signal of the deflection signal generator 165. The wobble signal and deflection signal are selected by the signal from the timing generator 161 by the second signal selector 164. The output of the second signal selector 164 is connected to the deflector 166. The deflector 166 deflects the light spot by ½ track pitch in the ID field, and vibrates the light beam or spot in the radial direction in fields other than the ID fields, thereby wobbling (oscillating) the groove. The optical head 151 is moved by the distance corresponding to the portion of track pitch by one revolution in the radial direction by the signal of the feed controller 158.

Thus, the optical disc mother board 150 is cut, but the phase of the rotation of the spindle motor 152 and the output signal of the wobble signal generator 159 is deviated due to effects of rotation fluctuation or eccentricity of the optical disc mother board 150. Herein, to adjust the initial phase of wobble signal in every revolution, on the basis of the output signal from the single rotation detector 153, the reset signal generator 155 resets the wobble signal generator 159 in every revolution. As a result, depending on the actual rotation of the optical disc mother board 150, the phase of the wobble signal is securely adjusted at a specified place once in every revolution, thereby eliminating the possibility of accumulation of phase deviation.

Embodiment 5

Figure 10:
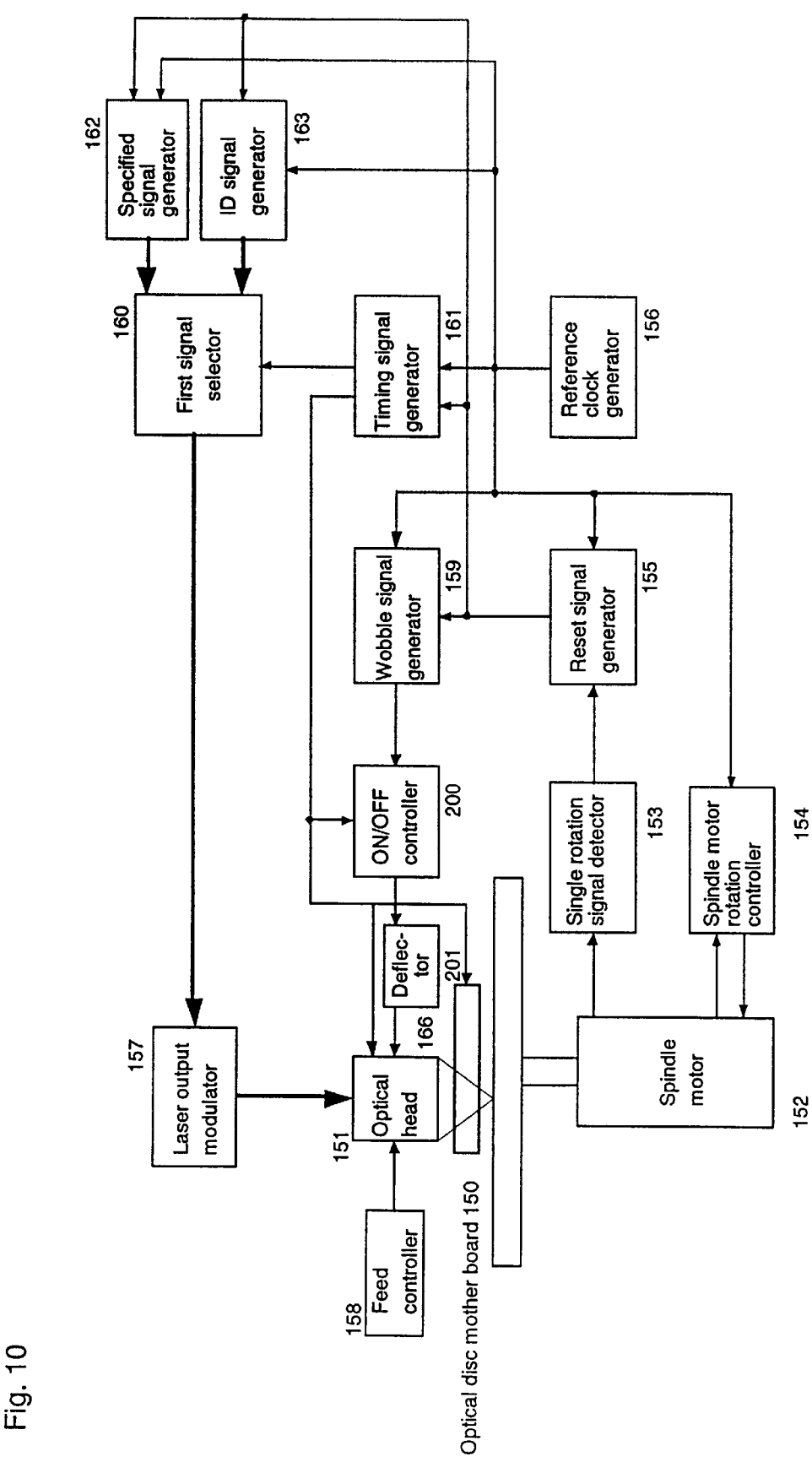
FIG. 10 is a structural diagram of an optical disc manufacturing apparatus according to a fifth embodiment of the invention.

FIG. 10 shows an optical disc manufacturing apparatus according to a fifth embodiment of the invention. This optical disc manufacturing apparatus is designed to manufacture an optical disc having the address information of the ID field independently in the middle position of the land and groove, as explained in FIG. 8(a) and FIG. 8(b).

In FIG. 10, only the portions different from FIG. 9 showing the constitution of the optical disc manufacturing apparatus in the fourth embodiment of the invention are described below.

What differs from FIG. 9 is an on/off controller 200 and a light spot diameter controller 201. The on/off controller 200 controls the signal of the wobble signal generator 159, and wobbles the guide track outside of the ID field. The light spot diameter adjuster 201, using liquid crystal or the like, changes the numerical aperture NA of the optical constant, and varies the effective diameter of the light spot.

Referring to FIG. 10, the outline of the actual cutting operation of the optical disc is explained below. Explanation of the same operation as in the optical disc manufacturing apparatus in the fourth embodiment is omitted.

The signal in the ID field from the ID signal generator 163 is provided to the first signal selector 160.

Specified data for forming a groove from the specified signal generator 162 is passed to the first signal selector 160. The output signal from the first signal selector 160 is selected depending on the output of the timing signal generator 161. In the address fields of ID1 to ID4, the signal from the ID signal generator 163 is selected, and in other fields, the signal from the specified signal generator 162 is selected.

Receiving the output signal from the first signal selector 160, the laser output modulator 157 sends out a signal to the optical head 151 so that the laser light of specified intensity may be issued from the optical head 151. As a result, the optical head 151 emits laser light at specified output value, and illuminates the optical disc mother board 150.

To generate wobble in the guide track, the wobble signal from the wobble signal generator 159 is used. The wobble signal is fed into the on/off controller 200, and the wobble signal is turned on in fields other than the ID field by signal from the timing signal generator 161. The output of the on/off controller 200 is connected to the deflector 166. The deflector 166 vibrates the light spot in the radial direction in fields other than the ID field, and wobbles the groove. Further, by the signal from the timing signal generator 161, the light spot diameter controller 201 controls to reduce the light spot in the ID field. The optical head 151 is moved by a distance corresponding to the portion of track pitch per revolution in the radial direction by a signal from the feed controller 158.

Thus, the optical disc mother board 150 is cut, but the phase of the rotation of the spindle motor 152 and the output signal of the wobble signal generator 159 is deviated due to effects of rotation fluctuation or eccentricity of the optical disc mother board 150. Herein, to adjust the initial phase of wobble signal in every revolution, on the basis of the output signal from the single rotation detector 153, the reset signal generator 155 resets the wobble signal generator 159 in every revolution. As a result, depending on the actual rotation of the optical disc mother board 150, the phase of the wobble signal is securely adjusted at a specified place once in every revolution, thereby eliminating the possibility of accumulation of phase deviation.

Embodiment 6

Figure 11:
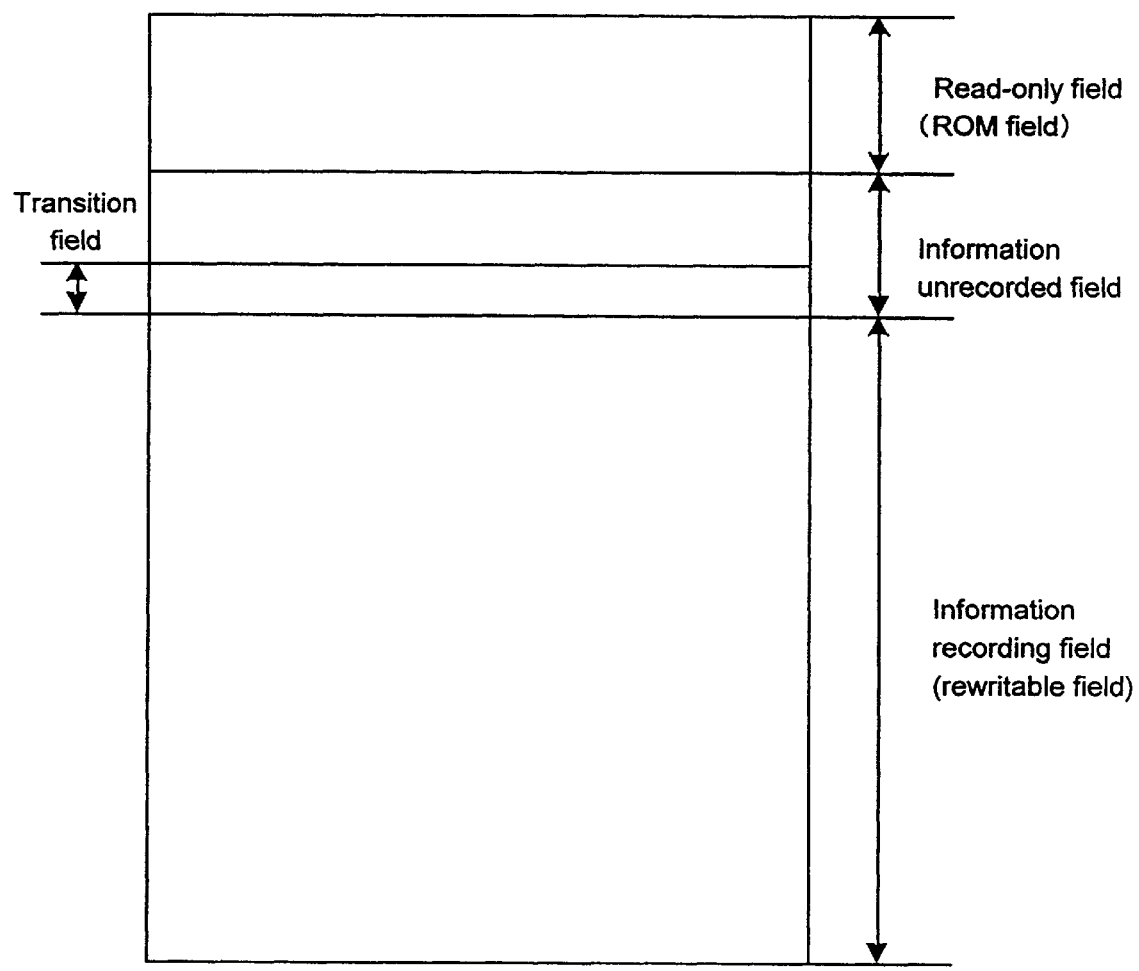
FIG. 11 is a diagram showing the relation of a ROM field for reading only, a rewritable field, and an information unrecorded field, in an optical disc of a sixth embodiment of the invention.

FIG. 11 shows the relation of a ROM field for reading only, a rewritable field capable of rewriting information, and an information unrecorded field, in an optical disc of a sixth embodiment of the invention.

Figure 12:
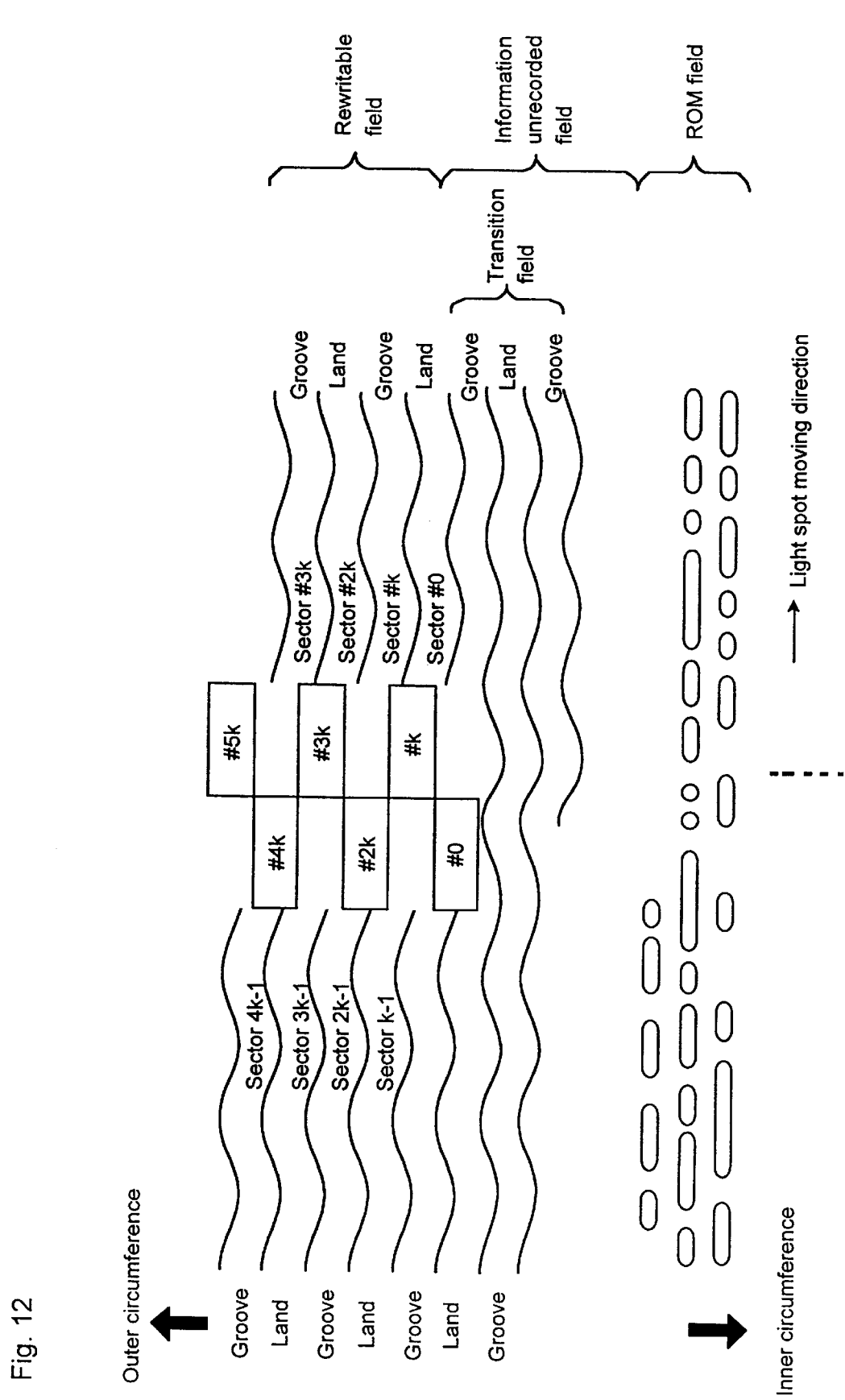
FIG. 12 is a magnified view of a transition field between ROM field and rewritable field.

As shown in FIG. 11, a ROM field for reading only, a rewritable field capable of rewriting information, and an information unrecorded field provided in the middle between the ROM field and rewritable field are available, and a transition field is provided in a part or whole area at the rewritable field side of the information unrecorded field. A magnified view of the transition field between the ROM field and rewritable field is shown in FIG. 12. The transition field composition is considered in two types. In one type, as in the transition field shown in FIG. 12, without containing address field or ID, it is composed of continuous guide track containing wobble signal. In another type, as in the rewritable field, it is composed of the address field or ID. In either case, a processing clock for recording processing can be generated.

For example, when recording information in sector #0, after tracking the light spot in the transition field (groove) out of the information unrecorded field, a clock for recording processing can be obtained on the basis of the wobble signal obtained from the RF signal. Herein, the moving direction of the light spot is assumed to be the arrow direction(from left to right in the diagram). In order to attract the light spot into the transition field is required to be at least equivalent to one track because the incident angle during rotation of the optical disc cannot be specified.

In FIG. 12, the transition field is three tracks long, and the groove and land are changed over in every revolution. The changeover spot of groove and land in the transition field may be an area of the beginning of the ID field extended to the inner circumferential side, or an area of the final portion of the ID field extended to the inner circumferential side. Alternatively, the groove and land may not be changed over.

Sector #0 is not always required to start from a land track, but may start from a groove track.

As explained herein, according to the optical disc of the embodiment, by disposing the transition field in a part or whole area at the rewritable field side of the information unrecorded field, a recording clock can be stably generated from the groove in sector #0 at the beginning of the rewritable field.

Embodiment 7

Figure 13:
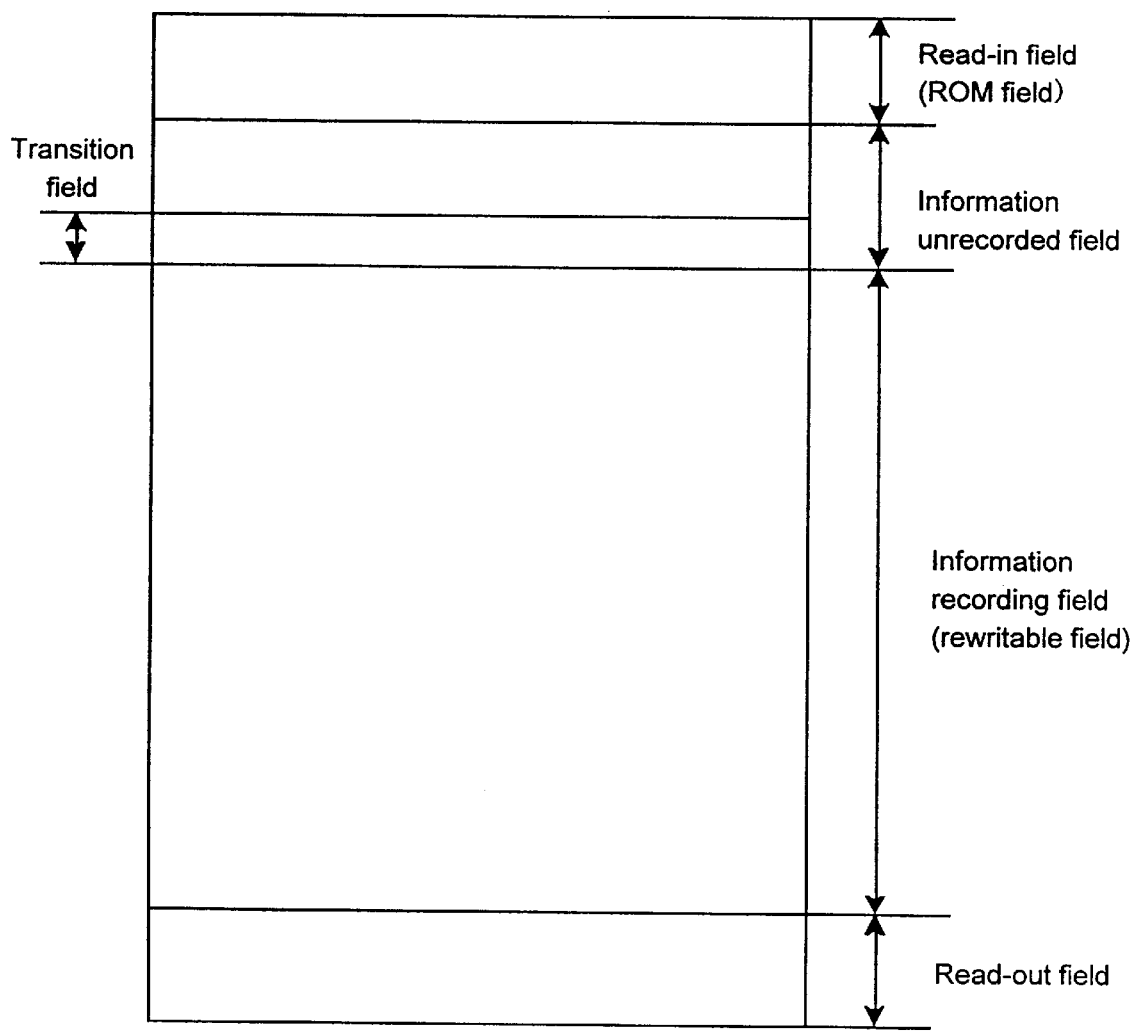
FIG. 13 is a diagram showing the relation of a reading field for reading only, an information unrecorded field, a rewritable field, and a read-out field, in an optical disc of a seventh embodiment of the invention.
Figure 14:
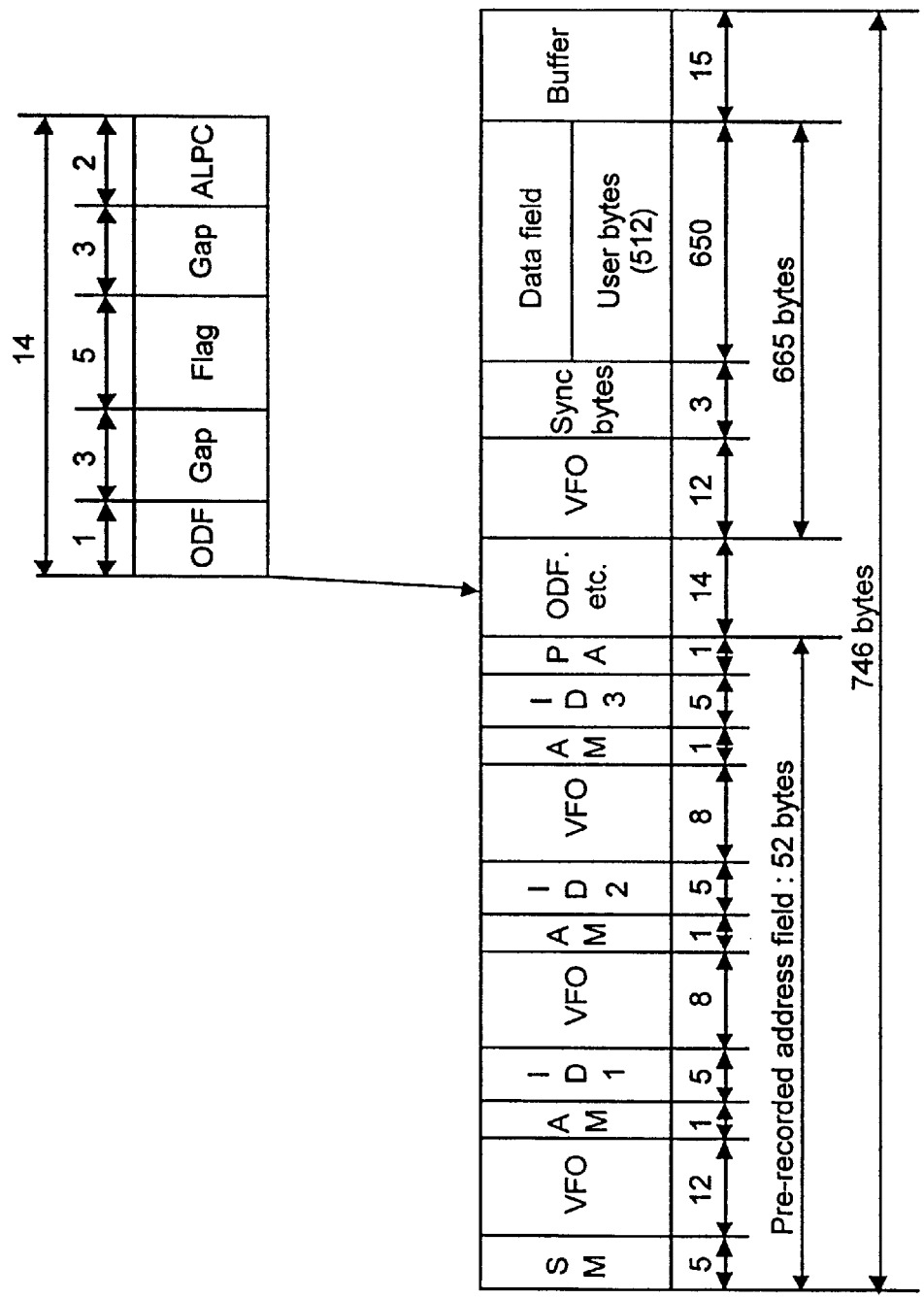
FIG. 14 is a diagram showing an example of format of a conventional optical disc.

FIG. 13 shows the relation of a read-in field for reading only, an information unrecorded field containing transition field, a rewritable field, and a read-out field, in an optical disc of a seventh embodiment of the invention.

Herein, the track pitch To of the read-in field which is a ROM field for reading only, and the track pitch Tw of the rewritable field are set in a relation of $To >= Tw$. That is, in several optical discs differing in the data capacity, the track pitch of the read-in field is constant, while the track pitch of the rewritable field is variable in order to change the data capacity. As a result, when the data capacity in the rewritable field is minimum, $To = Tw$, and when the capacity of the rewritable field increases, the track pitch Tw of the rewritable field is narrowed.

In the optical disc of the embodiment as described herein, by arranging that the track pitch To of the read-in field, and the track pitch Tw of the rewritable field may be in a relation of $To >= Tw$, optical discs differing in data capacity in the rewritable field can be easily reproduced since the track pitch is the same in the read-in field to be reproduced in the first place. Besides, by knowing the characteristic of the track of the rewritable field according to the reproduced control information, the tracking control depending on the track characteristic is realized, and compatibility may be easily guaranteed.

What is claimed is:

1. An optical disc, comprising: a plurality of sectors on a guide track, each of said sectors having an ID field, an information recording field, and an information unrecorded field disposed between said ID field and said information recording field, said ID field including a plurality of address information recorded in convex and concave signals and arranged in two sets, each set being offset by about ½ track pitch in the direction of one of an internal and external circumferential track adjacent to said guide track, said information recording field comprising grooves and lands oscillating at a single frequency in a radial direction with respect to said guide track, and said grooves and lands alternating in every turn of said guide track;

wherein the beginning of information in at least one of a plurality of said recording fields is detectable based on a specific phase of said oscillating frequency Previously determined prior to recording.

* * * * *

UNITED STATES PATENT AND TRADEMARK OFFICE
CERTIFICATE OF CORRECTION

PATENT NO. : 6,373,815 B1
DATED : April 16, 2002
INVENTOR(S) : Takashi Ishida et al.

It is certified that error appears in the above-identified patent and that said Letters Patent is hereby corrected as shown below:

<u>Column 14,</u>
Line 41, change "Previously" to -- previously --.

Signed and Sealed this

Eighth Day of April, 2003

JAMES E. ROGAN
*Director of the United States Patent and Trademark Office*